United States Patent Office 3,210,747
Patented Oct. 5, 1965

3,210,747
TELEMETERING SYSTEM
Manfred E. Clynes, Orangeburg, N.Y., assignor, by mesne assignments, to Technical Measurement Corporation, North Haven, Conn., a corporation of Delaware
Filed Apr. 5, 1962, Ser. No. 185,319
10 Claims. (Cl. 340—206)

This invention relates generally to telemetering systems, and more particularly to a system using a common transmitter for simultaneously conveying a multiplicity of intelligence signals within a relatively narrow band and without interference therebetween.

There are many situations in which several signals, each representative of an individual intelligence, must be concurrently transmitted to a remote point for monitoring or recording. Thus in physiological and bio-medical investigations wherein a patient or an experimental animal is subjected to physical tests under actual stress conditions, it is often necessary simultaneously to monitor and record such factors as body temperature, heart and respiration rate, blood pressure, muscle activity, chest sounds, and hydration.

Various transducers and sensors are available for such investigations. For example, temperature may be sensed by thermistors, breath sounds may be picked up by a microphone, and respiratory rate read by a strain gauge. Galvanic skin resistance may be measured by the use of chest electrodes to indicate hydration, and other electrodes may be attached to a patient to produce cardiac and encephalographic voltages.

When these physical findings, each represented by a signal, are to be monitored at a remote location, say from an air or space vehicle to a ground station, it is obviously not feasible to use a separate radio transmitter for each signal. Nor are conventional multiple side band, carrier telephony or multiplex techniques entirely satisfactory for this purpose.

In side band or carrier telephony systems, the band width requirements for each signal are such that with a large number of signals to be transmitted, the total frequency range occupied is excessive and impractical. In the case of multiplex transmission systems involving sequential and synchronized sampling of the signals at both the transmitter and receiver, the greater the number of signals, the more degraded the transmission of the individual signals. Multiplex techniques are also applicable to pulse time and pulse code modulation arrangements. However multiplex systems whether of the signal or pulse type involve elaborate and expensive installations and have large space requirements which are a serious drawback where space is at a premium.

In view of the foregoing, it is the primary object of the invention to provide a novel telemetering system of exceptionally high efficiency, whereby a multiplicity of signals may be propagated simultaneously by a single transmitter within a relatively narrow frequency band.

A further object of the invention is to provide a highly portable telemetering transmitter for a system of the above-described type which simultaneously transmits a multiplicity of signals without cross interference therebetween, no sequential sampling or synchronization being required.

Still another object of the invention is to provide a telemetering system in which each signal is transmitted in the form of a pulse train having a predetermined and distinct carrier frequency, the repetition rate of the carrier pulse in each train thereof being modulated as a function of signal amplitude. A significant feature of the invention is that the various pulse trains are derived from a common transmitter.

Yet another object of this invention is to provide a telemetering system transmitting station adapted to assume a highly compact form and having very low power consumption, whereby the station may be transported in space vehicles or otherwise installed for automatic and unattended operation.

Also an object of the invention is to provide a receiving station adapted to intercept signals from a transmitter of the above-described type faithfully to reproduce the original signals, the receiver being of simple and reliable design.

While the invention is described herein in connection with the transmission of various signals representative of physiological phenomena, it is to be understood that the basic principles are fully applicable to other non-biological telemetering problems, such as the transmission of environmental data (wind direction, atmospheric pressure, temperature, etc.) from sensors at a ground weather station or in radiosonic equipment. Also in modern automation systems it is often necessary to sense dynamically a variety of variables, such as pressure, flow rate, liquid level and so on, and to transmit such data continuously to a control station. It will become evident that the telemetering system in accordance with the invention is well adapted to carry out such functions as well as many others.

Briefly stated the objects in accordance with the invention are attained in a telemetering system wherein the various intelligences to be transmitted are each represented by a signal of varying amplitude, each signal being first converted into a train of voltage pulses whose repetition rate varies as a function of signal amplitude. The respective trains of voltage pulses representing the group of signals to be transmitted are of constant amplitude and duration, but the amplitude level of each train is different from every other train in the group. The group of pulse trains is applied to a frequency-modulated high-frequency transmitter which is normally quiescent and is rendered operative only when a modulating voltage pulse is applied thereto.

Inasmuch as the operating frequency of the transmitter is shifted from a mean value in accordance with the amplitude level of the pulses applied thereto, each train of pulses of a different constant amplitude level produces at a transmitter output a corresponding train of high-frequency carrier pulses having a prescribed carrier frequency distinct from every other train. The differences between the various voltage pulse amplitude levels may be made relatively small, whereby the high-frequency pulses of the group have carriers which fall within a relatively narrow frequency band.

At the receiving terminal, it is only necessary to provide a group of tuned circuits each peaked to a specified carrier pulse frequency to intercept and segregate the several incoming carrier pulse trains which may then be demodulated to recover the original signals, each of which may be recorded in a manner appropriate to the signal.

For a better understanding of the invention, as well as other objects and further features thereof, reference is made to the following detailed description to be read in conjunction with the accompanying drawing, wherein.

Figure 1:
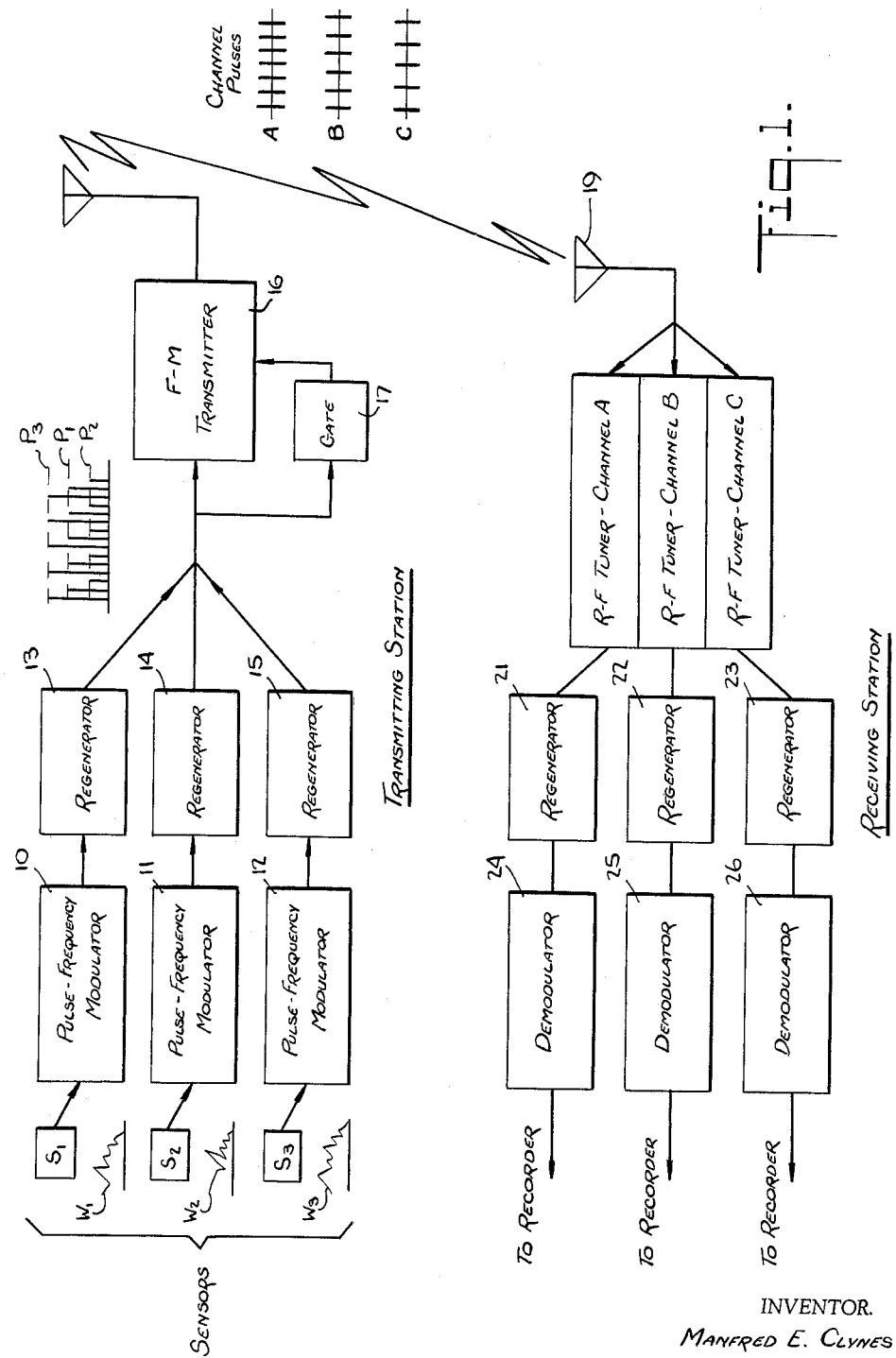
FIG. 1 is a block diagram of a system in accordance with the invention.

Referring now to the drawings, to illustrate the principles underlying the invention in the simplest possible form, we shall assume that the telemetering system is intended to transmit only three signals derived from sensors $S_1$, $S_2$ and $S_3$. It is to be understood however that in practice a far greater number of sensors may be used. These sensors may be in any known form for biological or non-biological purposes. Thus the sensors may be constituted by temperature-sensitive resistors, strain gauges, microphones, pick-up electrodes, or any other form of transducer producing a varying output voltage in response to stimuli, this voltage constituting the signal intelligence to be transmitted.

Figure 2:
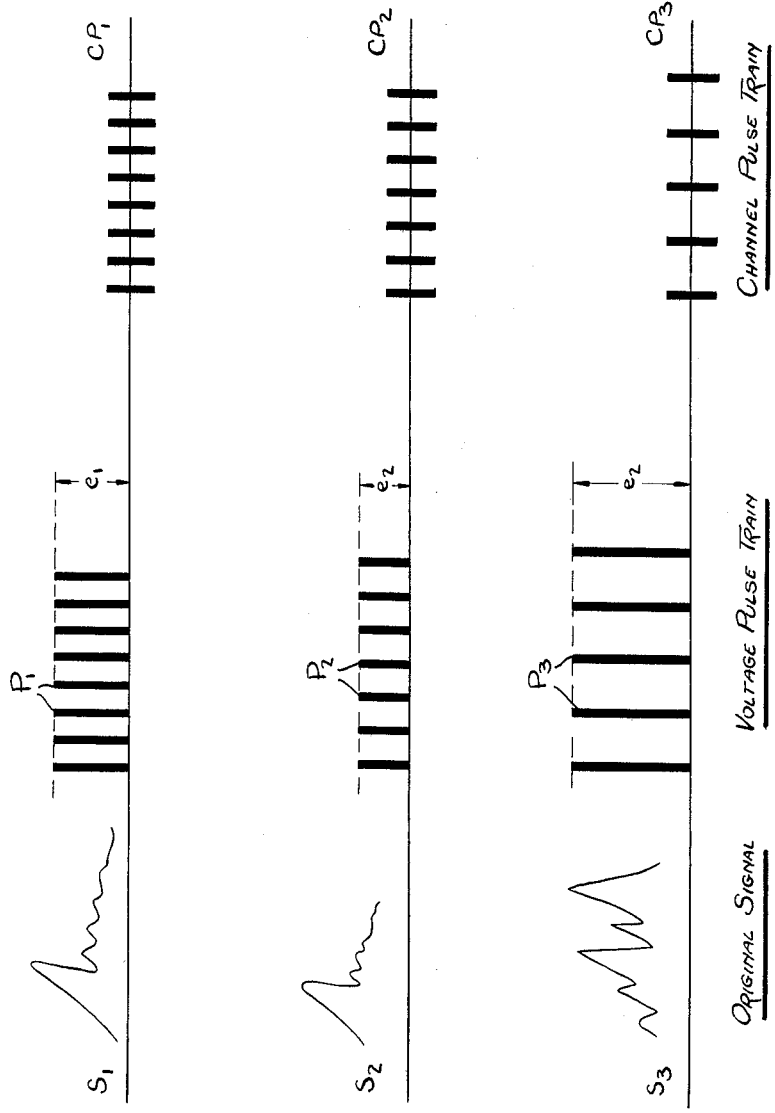
FIG. 2 are wave forms showing the transformation of the original signals into carrier pulses.

We shall assume for purposes of demonstration, that sensor $S_1$ produces a signal whose amplitude varies as a function of body temperature, as shown by wave form $W_1$ in FIG. 2, sensor $S_2$ produces a signal whose amplitude varies as a function of blood pressure, represented by wave form $W_2$, and sensor $S_3$ produces a signal whose amplitude varies as a function of heart activity, as indicated by wave form $W_3$.

The signals from $S_1$, $S_2$ and $S_3$ are fed either directly or through suitable amplifiers to pulse frequency modulators 10, 11 and 12, respectively, each adapted to generate pulses having a repetition rate which is proportional to the varying amplitude of the applied signal. The modulators may for example have a carrier frequency of 200,000 cycles per second, the carrier rate being varied as a function of the signal.

Suitable modulator circuits for this purpose are disclosed in applicant's co-pending applications Serial No. 829,694, filed July 27, 1959, and Serial No. 72,171, filed November 25, 1960, the modulators being comprised of an astable asymmetrical multivibrator generating pulses which vary about the carrier frequency in accordance with the applied signal. Thus the outputs of the modulators 10, 11 and 12 are frequency-modulated voltage pulses.

To standardize the amplitude and duration of the voltage pulses yielded by the modulators, the respective trains thereof are fed into regenerators or pulse shapers 13, 14 and 15 each of which may take the form of a monostable multivibrator, as disclosed in co-pending application Serial No. 928,694, responsive to an input pulse to produce a single uniform output pulse of constant amplitude and duration.

The standardized pulse trains produce in regenerators 13, 14 and 15 have different constant amplitude levels, this being accomplished by adjusting the outputs of the regenerators or by feeding the pulses through linear amplifiers having different gain adjustments. Thus as shown in FIG. 2, the voltage pulse train $P_1$ for signal $W_1$ has a fixed amplitude level $e_1$, the pulse train $P_2$ for signal $W_2$ has a relatively small fixed amplitude level $e_2$, and the pulse train $P_3$ for signal $W_3$ has a larger fixed amplitude level $e_3$.

The three voltage pulse trains $P_1$, $P_2$ and $P_3$ are fed as modulating signals to a frequency-modulated transmitter 16 which may take any conventional form. For a highly compact system a subminiature transmitter may be used of the type disclosed in the Digest of the 1961 International Conference on Medical Electronics in the article "Subminiature Electroencephalograph for Radio-Telemetering," page 123, wherein the transmitter is constituted by a multiple-stage transistor amplifier feeding into a frequency-modulated high-frequency oscillator using a single transistor operating say at 100 megacycles. Modulation is accomplished by a change of the collector-barrier capacitance with the collector voltage, the capacity being part of the overall capacity which determines the frequency of oscillation.

The amplified pulses $P_1$, $P_2$ and $P_3$ led to the emitter of the oscillator transistor are superimposed on the collector voltage. The working point of the transistor as well as the choice of network components influences the magnitude and linearity of the frequency deviations.

In frequency-modulation, the frequency swing of the oscillator depends on the amplitude of the modulating signal but is independent of its frequency. Consequently, the three trains of pulses $P_1$, $P_2$ and $P_3$ having different constant amplitude levels, will each cause the oscillator carrier to deviate from its initial operating frequency to an extent in proportion to the applied pulse amplitude level. In the example given, three distinct swings will be produced, giving rise to three pulse channel frequencies.

An electronic gate circuit 17 is provided which acts to maintain the oscillator of the transmitter 16 normally quiescent or inoperative, the oscillator being rendered operative only when a modulating pulse is applied thereto. In practice, the gate circuit may consist of a single-shot multivibrator responsive to pulses $P_1$, $P_2$ and $P_3$ of different amplitude to produce control pulses of common amplitude which serve to control a biasing circuit adapted to lift a cut-off bias from the oscillator whereby the oscillator is operative only when a modulating pulse is applied thereto.

Thus the F-M oscillator produces carrier output pulses only when an input voltage pulse is applied thereto, the input pulse trains of different amplitude producing channel pulse trains of different frequency but of constant amplitude. For example, as shown in FIG. 2, the channel pulse train $CP_1$ may have a carrier frequency of 110 megacycles, the channel pulse train $CP_2$ of 102 megacycles, and the channel pulse train $CP_3$ of 115 megacycles. In practice, the duty cycle of the voltage pulses is made extremely brief compared to the interval between pulses, and while the pulses $P_1$, $P_2$ and $P_3$ are fed concurrently to the F-M oscillator 16, coincidence will occur with statistical infrequency and not give rise to perceptible cross modulation.

The channel pulses $CP_1$, $CP_2$ and $CP_3$ are simultaneously radiated by antenna 18 (or transmitted by coaxial cable or other means), and are intercepted by a receiving antenna 19 to be applied to a receiver 20. Receiver 20 is constituted by three R-F tuner channels A, B and C each tuned to the carrier frequency of a particular carrier pulse. Since each channel pulse has a distinct carrier frequency, the R-F tuners may be sharply tuned as by crystal filters, to pick up a particular train of pulses without interference from other trains.

Each R-F tuner channel in receiver 20 includes a detector which may be a simple diode circuit to convert the incoming R-F pulses to voltage pulses. Inasmuch as the amplitude level and wave shape of the pulse trains yielded by channels A, B and C may vary or be distorted by reason of transmission effects, such as fading, it is necessary to again standardize the pulse trains. This is accomplished by a second set of pulse shapers or regenerators 21, 22 and 23 coupled to the outputs of channels A, B and C, respectively, to produce pulses of constant amplitude and duration. The amplitude level of these pulse trains need not be different except to the extent dictated by the recording or monitoring system to which they are applied.

The demodulation of the received and standardized pulses may be carried out by means of demodulators 24, 25 and 26, coupled to regenerators 21, 22 and 23, respectively. Each demodulator may take the form of a passive filter network adapted to average the pulses applied thereto to produce an output signal which is a faithful replica of the original signal.

These signals are applied to monitors or recording instruments appropriate to the intelligence in question. Thus the signal representative of heart activity would be applied to an electrocardiographic device, the blood pressure signal to a manometer, and the temperature signal to a meter calibrated in terms of Fahrenheit.

Thus the various intelligence signals at the transmitting station are each converted to a standardized pulse voltage train whose repetition rate varies as a function of the signal amplitude, the several voltage pulse trains being of different amplitude levels.

These trains frequency modulate to a common oscillator to produce carrier pulse trains having discrete carrier frequencies, which trains are intercepted and segregated at a receiving station by differently tuned receiving channels, the resultant pulse trains being demodulated to recreate the original signals.

In practice, even where a large number of signals is transmitted simultaneously, the degree of cross-modulation is not appreciable. For example, let us assume one high-frequency carrier of 100 megacycles and a carrier pulse width of 0.2 microseconds. With an intelligence signal operating in the range of 0 to 100 cycles per second, it is necessary for effective transmission purposes that the associated pulse modulator (10) have an operating repetition rate of 500 pulses per second.

Thus the transmitting time per second is 500 times 0.2 microseconds, which equals 100 microseconds. Assuming now that a second high-frequency carrier of 102 megacycles is used for transmitting a second signal (say $S_2$), coincidence between the carrier pulse represented by the two signals will happen maximally only one time out of 10,000 times, the duty cycle being 1/10,000. Since only 500 pulses occur per second, this means one pulse every 20 seconds.

Moreover, this infrequent coincidence will produce distortion only if voltage pulses applied to the frequency-modulation transmitter obliterate each other carrier frequency to a sufficient degree to prevent triggering of the receiver. A partial obliteration is not harmful, especially since the frequency produced by the coincidence does not correspond to any tuned frequency of the receiver. In other words, if in the area of coincidence between two applied pulses the resultant amplitude is the algebraic sum of the two pulses of different amplitude, the resultant carrier pulse frequency will be outside the range of the tuned receiver channels.

While there has been disclosed what is considered to be a preferred embodiment of the invention, it is to be understood that many changes may be made therein without departing from the essential spirit of the invention, as defined in the annexed claims.

What is claimed is:

1. A system for propagating a plurality of amplitude varying signals each indicative of a distinct intelligence, said system comprising:
    (a) a plurality of means each responsive to a respective one of said plurality of signals to produce a train of voltage pulses whose repetition rate varies as a function of the amplitude of the signal applied thereto and whose amplitude has a predetermined constant level which differs from the level of the voltage pulse trains derived from the other signals,
    (b) a normally quiescent frequency-modulated carrier oscillator whose output frequency, when the oscillator is operative, depends on the amplitude of an input voltage pulse applied thereto,
    (c) a pulse-responsive control device coupled to said oscillator to render it operative only when an input voltage pulse is applied to said device,
    (d) means to apply the voltage pulses in each train thereof both to said device and to said oscillator to render said oscillator operative to produce for each voltage pulse applied to said device an output carrier whose frequency depends on the amplitude of the same voltage pulse, whereby said oscillator yields for each applied train of voltage pulses a corresponding train of carrier pulses having a distinct frequency, and
    (e) receiver means to intercept the trains of carrier pulses and including selective circuits to separate the trains of carrier pulses from each other and demodulation circuits coupled to said selective circuits to demodulate each of said trains of carrier pulses, thereby to recover said amplitude varying signals.

2. In a telemetering system; a transmitting station comprising:
    (a) a plurality of sensors each yielding a signal indicative of a distinct intelligence,
    (b) a plurality of means coupled to said sensors, each means being responsive to a respective one of said plurality of signals to produce a train of voltage pulses whose repetition rate varies as a function of the amplitude of the signal applied thereto and whose amplitude has a predetermined constant level which differs from the level of the voltage pulse trains derived from the other signals,
    (c) a normally quiescent frequency-modulated carrier oscillator whose output frequency, when the oscillator is operative, depends on the amplitude of an input voltage pulse applied thereto,
    (d) a pulse-responsive control device coupled to said oscillator to render it operative only when an input voltage pulse is applied to said device, and
    (e) means to apply the voltage pulses in each train thereof both to said device and to said oscillator to render said oscillator operative to produce for each voltage pulse appled to said device an output carrier whose frequency depends on the amplitude of the same voltage pulse, whereby said oscillator yields for each applied train of voltage pulses a corresponding train of carrier pulses having a distinct frequency.

3. In a telemetering system; a transmitting station comprising:
    (a) a plurality of sensors each yielding a signal indicative of a distinct intelligence,
    (b) a plurality of analog to digital converters coupled to said sensors, each converter being responsive to a respective one of said plurality of signals to produce a train of voltage pulses whose repetition rate varies as a function of the amplitude of the signal applied thereto,
    (c) a plurality of pulse regenerators coupled to said converters, each producing a corresponding output train of standardized voltage pulses whose amplitude has a predetermined constant level which differs from the level of the output pulse trains derived from the other signals,
    (d) a normally quiescent frequency-modulated carrier oscillator whose output frequency, when the oscillator is operative, depends on the amplitude of an input voltage pulse applied thereto,
    (e) a pulse-responsive control device coupled to said oscillator to render it operative only when an input voltage pulse is applied to said device, and
    (f) means coupled to said regenerators to apply the voltage pulses in each output train thereof both to said device and to said oscillator to render said oscillator operative to produce for each voltage pulse applied to said device an output carrier whose frequency depends on the amplitude of the same voltage pulse, whereby said oscillator yields for each applied output train of voltage pulses a corresponding train of carrier pulses having a distinct frequency.

4. A telemetering system comprising:
    (A) a transmitting station including
        (a) a plurality of sensors each yielding a signal indicative of a distinct intelligence;
        (b) a plurality of analog to digital converters coupled to said sensors, each converter being responsive to a respective one of said signals to produce a train of voltage pulses whose repetition rate varies as a function of the amplitude of the signal applied thereto,
        (c) a plurality of pulse regenerators coupled to said converters, each producing a corresponding output train of standardized voltage pulses whose amplitude has a predetermined constant level which differs from the level of the pulses derived from the other signals,
        (d) a normally quiescent frequency-modulated carrier oscillator whose output frequency, when the oscillator is operative, depends on the amplitude of the input pulse applied thereto, (e) a pulse-responsive control device coupled to said oscillator to render it operative only when an input voltage pulse is applied to said device, (f) means coupled to said regenerators to apply the voltage pulses in each output train thereof both to said device and to said oscillator to render said oscillator operative to produce for each voltage pulse applied to said device an output carrier whose frequency depends on the amplitude of the same voltage pulse, whereby said oscillator yields for each applied output train of voltage pulses a corresponding train of carrier pulses having a distinct frequency, and (B) a receiving station intercepting the trains of carrier pulses transmitted by the transmitting station, and including:

(a) selective circuits to separate the trains of carrier pulses from each other, and (b) demodulation circuits coupled to said selective circuits to demodulate each of said trains of carrier pulses, thereby to recover said amplitude varying signals.

5. A telemetering system comprising:

(A) a transmitting station including (a) a plurality of sensors each yielding a signal indicative of a distinct intelligence;

(b) a plurality of analog to digital converters coupled to said sensors, each converter being responsive to a respective one of said signals to produce a train of voltage pulses whose repetition rate varies as a function of the amplitude of the signal applied thereto, (c) a plurality of pulse regenerators coupled to said converters, each producing a corresponding output train of standardized voltage pulses whose amplitude has a predetermined constant level which differs from the level of the pulses derived from the other signals, (d) a normally quiescent frequency-modulated carrier oscillator whose output frequency, when the oscillator is operative, depends on the amplitude of the input pulse applied thereto, (e) a pulse-responsive control device coupled to said oscillator to render it operative only when an input voltage pulse is applied to said device, (f) means coupled to said regenerators to apply the voltage pulses in each output train thereof both to said device and to said oscillator to render said oscillator operative to produce for each voltage pulse applied to said device an output carrier whose frequency depends on the amplitude of the same voltage pulse, whereby said oscillator yields for each applied output train of voltage pulses a corresponding train of carrier pulses having a distinct frequency, and (B) a receiving station intercepting the trains of carrier pulses transmitted by the transmitting station, and including:

(a) a plurality of selective tuners, each tuned to the frequency of a respective train of carrier pulses to separate the trains from each other, (b) a plurality of pulse regenerators coupled to said tuners to produce corresponding trains of carrier pulses which are standardized, and (c) a plurality of demodulators coupled to said pulse regenerators to demodulate each train of standardized carrier pulses, thereby to recover said amplitude varying signals.

6. A system as set forth in claim 5, wherein each of said analog to digital converters is constituted by a free-running astable multivibrator which is responsive to an applied signal of varying amplitude to produce a train of pulses whose repetition rate varies as a function of the signal amplitude.

7. A system as set forth in claim 5, wherein each pulse regenerator in said transmitting station and in said receiving station is constituted by a monostable multivibrator which is responsive to an applied pulse to produce an output pulse of constant duration and amplitude.

8. A system as set forth in claim 5, wherein each tuner in the receiving station is constituted by a crystal-controlled network tuned to the frequency of one of the trains of carrier pulses.

9. A system as set forth in claim 5, wherein each of said demodulators in said receiving station is constituted by a passive network to which a train of standardized carrier pulses is applied, said network acting to average the pulses applied thereto to produce a signal of varying amplitude.

10. A telemetering system comprising:

(A) a transmitting station including, (a) a plurality of sensors coupled to a living body, each sensor yielding a signal of varying amplitude indicative of a distinct body characteristic, (b) a plurality of analog to digital converters coupled to said sensors, each converter being responsive to a respective one of said signals to produce a train of voltage pulses whose repetition rate varies as a function of the amplitude of the signal applied thereto, (c) a plurality of pulse regenerators coupled to said converters, each producing a corresponding output train of standardized voltage pulses, whose amplitude has a predetermined constant level which differs from the level of the pulses derived from the other signals, (d) a normally quiescent frequency-modulated carrier oscillator whose output frequency, when the oscillator is operative, depends on the amplitude of an input voltage pulse applied thereto, (e) a pulse-responsive control device coupled to said oscillator to render it operative only when an input voltage pulse is applied to said device, (f) means coupled to said regenerators to apply the voltage pulses in each output train thereof both to said device and to said oscillator to render said oscillator operative to produce for each voltage pulse applied to said device an output carrier whose frequency depends on the amplitude of the same voltage pulse, whereby said oscillator yields for each applied output train of voltage pulses a corresponding train of carrier pulses having a distinct frequency, and (B) a receiving station intercepting the trains of carrier pulses transmitted by the transmitting station and including:

(a) a plurality of selective tuners each tuned to the frequency of a respective train of carrier pulses to separate the trains from each other, (b) a plurality of pulse regenerators coupled to said tuners to produce corresponding trains of carrier pulses which are standardized, (c) a plurality of demodulators coupled to said pulse regenerators to demodulate each train of standardized carrier pulses thereby to recover said amplitude varying signals, and (d) a recorder coupled to said demodulators and responsive to said signals to record the related body characteristics.

References Cited by the Examiner

UNITED STATES PATENTS

| 2,910,683 | 10/59 | Todd | 340—183 |
| 2,942,112 | 6/60 | Hearn | 340—182 |
| 2,974,313 | 3/61 | Parker | 340—183 |

NEIL C. READ, *Primary Examiner.*

THOMAS B. HABECKER, *Examiner.*